R. SCHLEMM.
RECUPERATOR.
APPLICATION FILED OCT. 14, 1920.

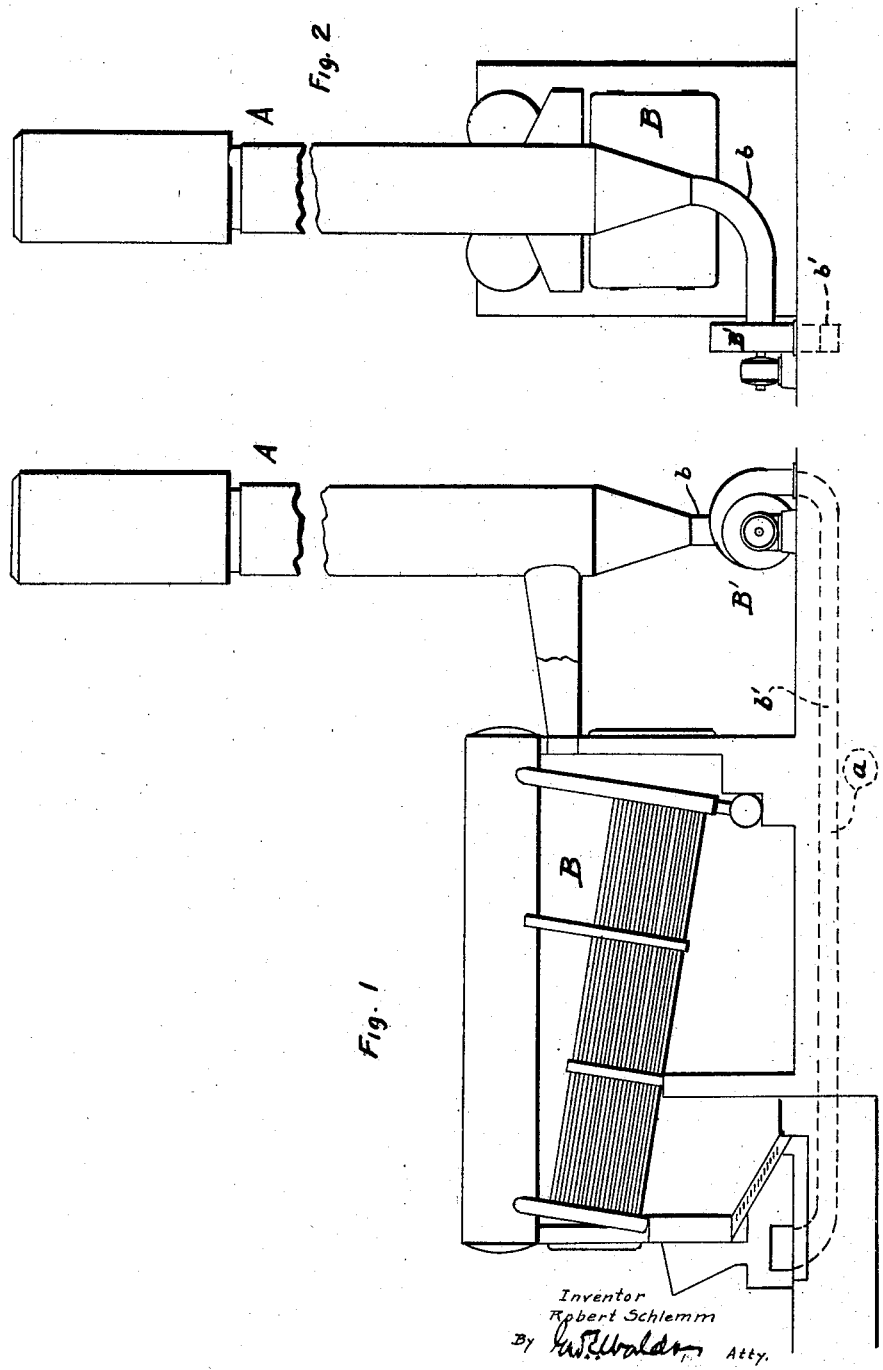

1,438,726.

Patented Dec. 12, 1922.
3 SHEETS—SHEET 2.

Inventor
Robert Schlemm

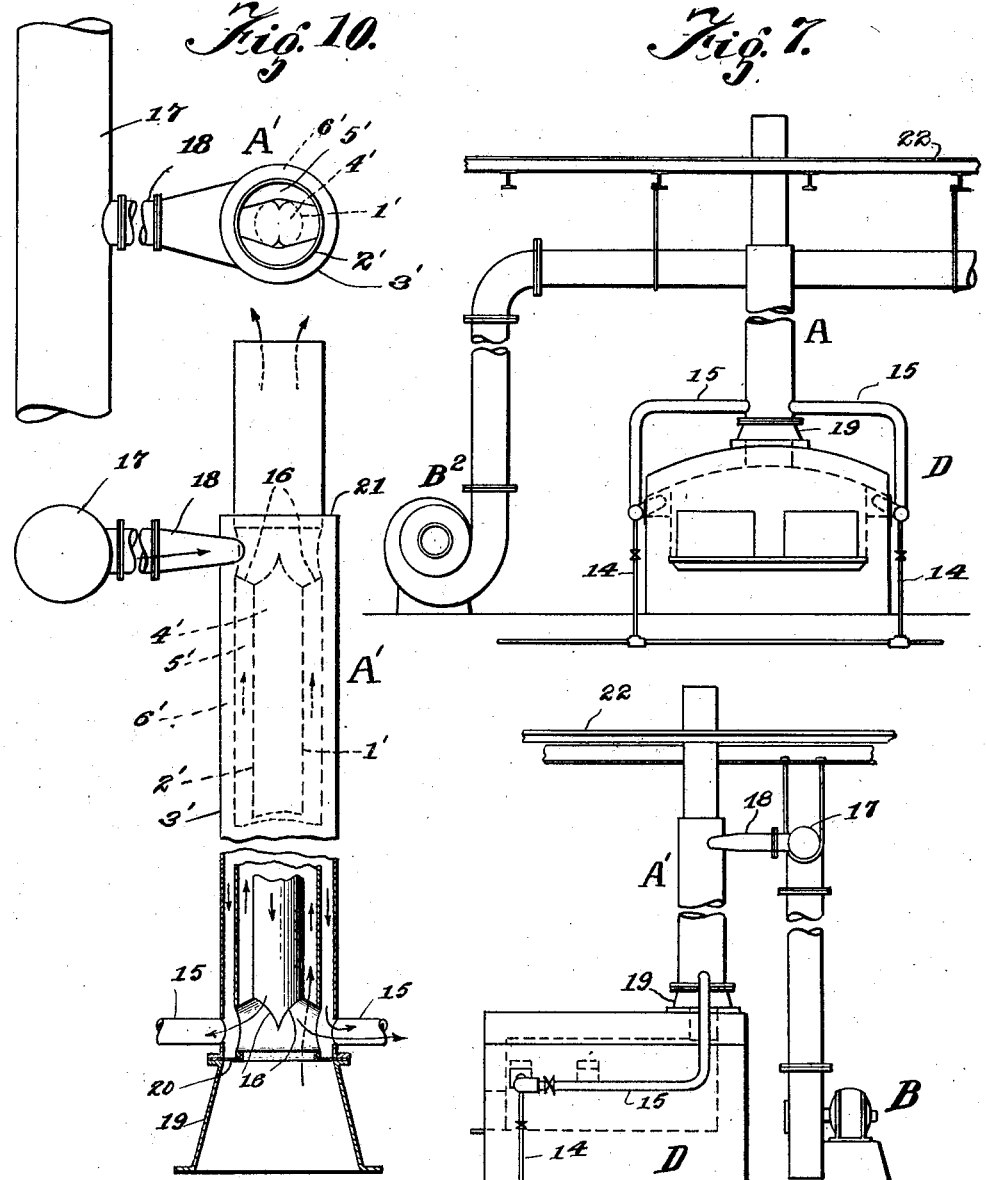

Patented Dec. 12, 1922.

1,438,726

UNITED STATES PATENT OFFICE.

ROBERT SCHLEMM, OF CHICAGO, ILLINOIS.

RECUPERATOR.

Application filed October 14, 1920. Serial No. 416,938.

*To all whom it may concern:*

Be it known that I, ROBERT SCHLEMM, a citizen of the United States, and a resident of Chicago, in the county of Cook and State of Illinois, have invented a new and useful Recuperator, of which the following is a specification.

This invention relates to recuperators designed and adapted for heating air supplied to furnaces by means of the hot waste gases discharged therefrom.

A principal object of my invention is to provide a recuperator in which air entering the furnace and the waste gases escaping therefrom will traverse adjacent flues or passageways separated by walls common to both thereof, said walls being made of material, as sheet steel, which is a good conductor of heat and which may be corrugated, if desired, to increase the area of radiating surfaces thereof, and the relation being such that the currents of air and of waste gases will traverse their respective flues in opposite direction, the air preferably entering the air flue or flues substantially at the point of discharge of the waste gases and escaping therefrom at the point where the waste gases enter the waste gas flue or flues, whereby the air will enter and pass through zones of progressively increasing temperatures, and a substantially uniform thermal head or temperature difference between the air and waste gases will be maintained, which, as is well known, will conduce to the most efficient operation of the recuperator.

With the described construction, it is obvious that by making said flues of proper length, the temperature of the waste gases leaving the recuperator may be reduced to that of the air entering the recuperator and the air discharged from said recuperator will be heated to approximately the temperature of the waste gases entering said recuperator: in other words, that substantially all available thermal units will be extracted from said waste gases and absorbed by the air supplied to the furnace, resulting in much more vigorous and perfect combustion of the fuel, with corresponding economy and saving in the quantity of fuel used.

For purposes of convenient reference, my improved recuperator may appropriately be designed a "counter-flow" recuperator.

In practice, I effect the foregoing object of the invention, by the use of a plurality of spaced stacks arranged one within another, preferably in concentric relation, forming separate flues comprising air supply flues and a waste gas flue arranged intermediate said air supply flues. That is, I provide a plurality of air and waste gas stacks arranged in alternate relation, both the extreme inner and outer stacks, forming air supply flues, said gas stack or stacks communicating with the breeching of the boiler and discharging into the air, and the air supply stacks or flues all discharging into a common chamber, a constant circulation of air being maintained downwardly in the air supply flues into said chamber and from said chamber to the combustion chamber of the furnace by a fan or injector adapted for exhausting air from said chamber and discharging it into the combustion space of the furnace.

A further object of the invention is to provide means for preventing the waste, burnt-out gases from being drawn into the air supply flues and returned to the furnace, which would operate to correspondingly reduce the maximum efficiency of the furnace in operation.

This object I effect, by means of a hood secured to the upper end of the waste gas stack, which opens through the top thereof, said hood being spaced from the outer air stack and the lower end thereof being open to permit air to enter the same, the upper end of the outer air flue communicating directly with said hood and the inner air flue or flues communicating therewith by means of a passageway or passageways extending across the gas flue, the sides of said passageways being closed to prevent waste gases from entering the same. Said hood is made of any length necessary to prevent waste gases discharged from the recuperator from being drawn into the open lower end thereof.

My improved recuperator also comprises the various other features, combinations of features and details of construction hereinafter described and claimed.

In the accompanying drawings in which my invention is fully illustrated, the figures of the drawings being to a large extent diagrammatic, Figure 1, is a side elevation of a recuperator of my invention shown as applied in use to a steam boiler.

Figure 2, is an end elevation thereof taken from the right hand side of Figure 1.

Figure 7, is an elevation of my improved recuperator shown as applied to use to a battery of forges.

Figure 8, is an elevation thereof from the right hand side of Figure 7.

Figure 9, is a detached enlarged side view, partly in sections, of the recuperator shown in Figure 8, illustrating the manner of supplying air thereto; and Figure 10, is a top plan view thereof.

Figure 4:
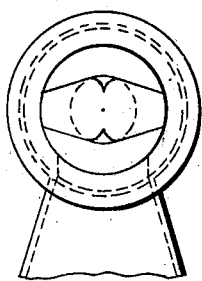
Figure 4, is a top plan view thereof.
Figure 6:
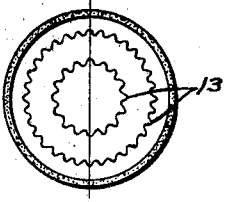
Figure 6, is a transverse sectional view on the line 6—6 of Figure 6.
Figure 3:
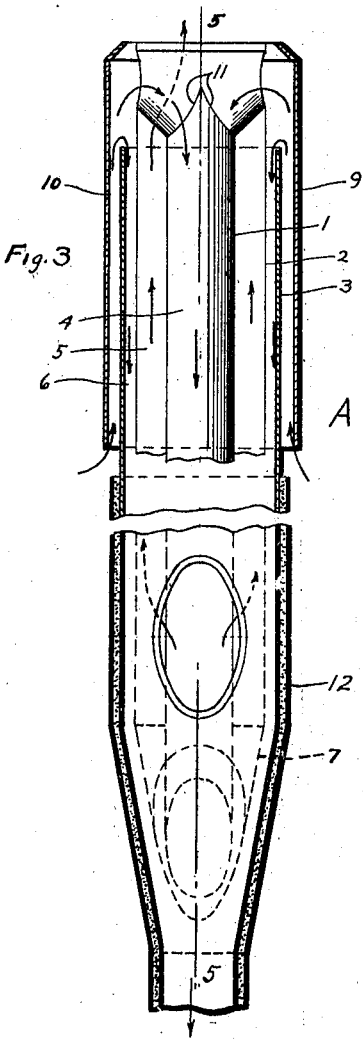
Figure 3, is an enlarged elevation thereof, partly in section on the line 3—3 of Figures 5 and 6.
Figure 5:
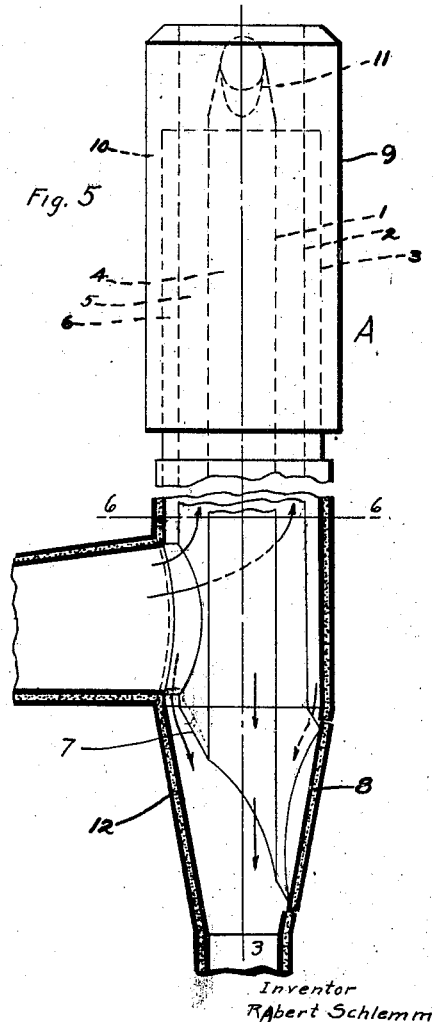
Figure 5, is an elevation of said recuperator at ninety degrees from that shown in Figure 3, said view being partly in section on the line 5—5 of Figure 3.

Referring now particularly to Figures 1 to 6 of the drawings, A designates, as a whole, a recuperator of my invention shown as applied in use to a steam boiler, designated as a whole B, to the combustion chamber of which air under forced draft is adapted to be supplied from the recuperator A by means of a blower $B^1$, which is connected into a pipe comprising a section $b$, which connects said blower with the recuperator, and a section $b^1$, which connects said blower with the combustion chamber of the boiler.

As shown, the boiler B is of the familiar type known to the trade as Babcock and Wilcox boilers. However, the use and application of my improved recuperator is in no way dependent upon the type of boiler, but admits of a wide range of application and use in connection with practically all forms of boilers of which I have any present knowledge, and I do not therefore desire to limit myself to the specific application shown or to use with any particular form or type of boiler.

Likewise the fan $B^1$, which is shown diagrammatically only, may be of any usual or desired construction, it being possible to purchase many different forms of fans suitable for the purpose in the open market.

In accordance with my invention, the recuperator A, comprises a plurality of stacks 1, 2 and 3, arranged one within the other, preferably in concentric relation, and which define flues of 4, 5 and 6.

Adjacent to its lower end, the intermediate stack 2, communicates with the breeching or waste gas space of the boiler B, the waste gases from which are discharged through the intermediate flue 5 defined by the inner stack 1 and the intermediate stack 2, passing upwardly therethrough, while the air for supporting combustion in the boiler furnace passes downwardly through the flues or passageways 4 and 6, respectively defined or formed by the inner stack 1 and by the stacks 2 and 3, the outer stack 3 being connected directly to the intake of the fan $B^1$ and the inner stack 1 passing through the wall of the intermediate stack 2 and opening directly into the lower end of the outer stack 3. With this connection, it is obvious that, in operation, the fan $B^1$ will create and maintain currents of air downwardly through the flues 4 and 6.

For purposes of convenient reference, the intermediate flue 5 will hereinafter designate the waste gas flue and the flues 4 and 6 the inner and outer air supply flues.

To provide access to the waste gas flue 5, for cleaning the same and for other purposes, the lower end of the intermediate stack 2 comprises an extension 7, which extends downwardly at an angle to said stack proper and which opens through the outer stack 3 adjacent to its lower end, the open lower end thereof being closed by a removable cover plate 8.

To prevent the waste, burned-out gases discharged from the waste gas flue 5 from entering the air supply flues and thus contaminating the air supply, a hood 9 is supported at the upper ends of the stack 2, said stack 2 opening through the top of said hood and said hood extending downwardly outside of the outer stack 3 so as to enclose the open upper end thereof, said hood being sufficiently larger than said stack 3 to form a passageway 10 through which air may enter the open upper end of said stack. Also, the enclosed upper end of said hood is connected with the upper end of the inner air flue 4 by means of elbows or branch pipes 11, which extend across the waste gas flue 5 and open through the walls of the inner stack 1 and intermediate stack 2, preferably above the top of the outer stack 3.

With the described construction, all air supplied to the boiler furnace will enter the lower end of the hood 9, which may be made of any length necessary to insure that waste gases discharged from the waste gas flue 5 will not be drawn into said hood.

To prevent radiation of heat from the outer stack 3, said stack is preferably covered with suitable insulating material, as magnesia or asbestos, indicated at 12, said insulation preferably terminating below the lower end of the hood 9.

For use in connection with steam boilers and in other application where temperatures are comparatively low, the stacks 1, 2 and 3 may be made of commercial boiler plate, while for forge use and other high temperature applications, the lower sections of the recuperator—where the high temperatures obtain—will be made of special heat resisting sheet metal or where temperatures run very high, of refractory material.

Also, to increase the radiating surfaces of the inner stacks 1 and 2, they may be corrugated, as shown at 13.

With the described construction, it is obvious that, by making the stacks 1, 2 and 3 of proper length, the waste gases will be discharged from the recuperator practically at atmospheric temperature, while the air supplied to the furnace will be heated substantially to the temperature of the waste gases where they are discharged from the combustion chamber or waste gas space of the boiler, and that, in this manner, practically all heat units, which otherwise would pass to waste with the waste gases from the boiler, would be reclaimed and returned to the furnace of the boiler, thus not only conserving heat and correspondingly reducing the quantity of fuel required, but, through the preheating of the air, producing a much more vigorous combustion and a correspondingly intense heat—all resulting in a greatly increased efficiency in the operation of the boiler or other heating apparatus, with a corresponding reduction and economy in fuel consumption.

As a modification of my improved recuperator, I contemplate a construction in which access of waste gases to the air supply flues will be prevented without the use of the hood shown in Figs. 1 to 6.

This modification of my improved recuperator is illustrated in Figures 7 to 10 of the drawings in which I have shown recuperators of my invention as applied in use to a battery of forge furnaces.

Referring now to said Figs. 7 to 11, D represents one of a battery of any number of forge or other furnace. As shown, said furnace is an oil burning furnace, the fuel oil being delivered to the combustion space thereof through pipes 14, and air under pressure for effecting combustion of said fuel oil being supplied thereto through pipes 15, preferably through injector nozzles, not shown, adapted for atomizing the fuel oil, in a familiar manner.

As in the form of recuperator shown in Figures 1 to 6, the recuperator shown in Figures 7 to 10, designed as a whole $A^1$, comprises an inner stack $1^1$ an intermediate stack $2^1$ and an outer stack $3^1$, which define flues $4^1$, $5^1$, and $6^1$, the inner and outer flues $4^1$ and $6^1$ being the air supply flues and the intermediate flue $5^1$ being the waste gas flue, and the air supplied to the furnace being heated by radiation from the stacks $1^1$ and $2^1$ which define the waste gas flue $6^1$ and are heated by the hot waste gases discharged therethrough, all as fully explained in connection with the form of recuperator shown in Figures 1 to 6.

As shown in said Figures 7 to 10, the inner and outer air supply flues $4^1$ to $6^1$ are connected, both at their upper and lower ends, by branch pipes or elbows 16 which extend across the intermediate waste gas flue $5^1$, and air under pressure is admitted thereto directly from an air trunk 17—which communicates with a source of supply of air under pressure, as shown with a fan $B^2$—said air trunk being common to the recuperators of all of the furnaces D and being connected directly to the upper end of the outer air supply flue $6^1$ of the recuperators of the different furnaces D by branch pipes or elbows 18. Air under pressure is delivered from the recuperator $A^1$ to the furnace D through the air supply pipes 15, which communicate directly with the lower end of the outer air supply flue $6^1$.

The stacks $1^1$, $2^1$ and $3^1$ are supported on a bonnet 19 on the furnace D, the outer air flue $6^1$ being cut off from said bonnet by a plate 20 and the waste gas flue $5^1$ being connected into a hole in said plate 20 through which the waste gases from the furnace pass into said waste gas flue.

The elbows 16 close both the upper and lower ends of the stack $1^1$ and the upper end of the outer air flue $6^1$ is closed by a plate 21 which is provided with a hole through which the waste gas stack $2^1$ extends, said waste gas stack being preferably made of such length that it will extend through the roof of the building indicated at 22.

I claim:

1. In a recuperator, the combination of a plurality of stacks arranged one within another forming separate flues comprising air supply flues and a waste gas flue arranged intermediate said air supply flues, the inner stacks between waste gas and air supply flues being made of material which is a conductor of heat, the lower ends of said air supply flues being adapted to be connected with the combustion chamber of a furnace and being provided at their upper ends with air supply connections, the lower end of the waste gas flue being adapted for connection with the waste gas space of a furnace and means for creating a circulation of air in said supply flues in a direction opposite to the circulation of waste gases in said waste gas flue, substantially as described.

2. In a recuperator, the combination of a plurality of stacks arranged one within another forming separate flues comprising air supply flues and a waste gas flue arranged intermediate said air supply flues, the inner stacks between waste gas and air supply flues being made of material which is a conductor of heat, the lower ends of said air supply flues being adapted to be connected with the combustion chamber of a furnace and being provided at their upper ends with air supply connections, the lower end of the waste gas flue being adapted for connection with the waste gas space of a furnace, means for creating a circulation of air in said air supply flues in a direction opposite to the circulation of waste gases in said waste gas flue, and means to prevent waste gases discharged from said waste gas flue from entering the air supply flues, substantially as described.

3. In a recuperator, the combination of a plurality of stacks arranged one within another forming separate flues comprising air supply flues and a waste gas flue arranged intermediate said air supply flues, the inner stacks between waste gas and air supply flues being made of material which is a conductor of heat, the lower ends of said air supply flues being adapted to be connected with the combustion chamber of a furnace and being provided at their upper ends with air supply connections, the lower end of the waste gas flue being adapted for connection with the waste gas space of a furnace, and means for creating a circulation of air in said air supply flues in a direction opposite to the circulation of waste gases in said waste gas flue, the operative lengths of said air supply and waste gas flues being substantially equal and coincident, substantially as described.

4. In a recuperator, the combination of a plurality of stacks arranged one within another forming separate flues comprising air supply flues and a waste gas flue arranged intermediate said air supply flues, the inner stacks between waste gas and air supply flues being made of material which is a conductor of heat, the lower ends of said air supply flues being adapted to be connected with the combustion chamber of a furnace and being provided at their upper ends with air supply connections, the lower end of the waste gas flue being adapted for connection with the waste gas space of a furnace, and means for creating a circulation of air in said air supply flues in a direction opposite to the circulation of waste gases in said waste gas flue, the operative lengths of said air supply and gas flues being substantially equal and coincident, and said stacks being so proportioned that the waste gases will be discharged from said recuperator approximately at atmospheric temperature, substantially as described.

5. In a recuperator, the combination of a plurality of stacks arranged one within another forming separate flues comprising air supply flues and a waste gas flue arranged intermediate said air supply flues, the inner stacks between waste gas and air supply flues being made of a material which is a conductor of heat, the lower ends of said air supply flues being adapted to be connected with the combustion chamber of a furnace and their upper ends being provided with air admission openings, the lower end of said waste gas flue being adapted to be connected with the waste gas space of a furnace, the waste gases passing upwardly through said waste gas flue, means for creating a circulation of air downwardly through said air supply flues, and a hood which encloses the upper end of the stack defining the outer air supply flue, and is supported in spaced relation thereto, said hood being of such length that it will prevent waste gases discharged from the waste gas flue from entering its open lower end, and a branch pipe, or pipes, which connect the interior of said hood with the inner air supply flue, substantially as described.

6. In a recuperator, the combination of a plurality of stacks arranged one within another forming separate flues comprising air supply flues and a waste gas flue arranged intermediate said air supply flues, the inner stacks between waste gas and air supply flues being made of material which is a conductor of heat and said stacks being corrugated, the lower ends of said air supply flues being adapted to be connected with the combustion chamber of a furnace and being provided at their upper ends with air supply connections, the lower end of the waste gas flue being adapted for connection with the waste gas space of a furnace and means for creating a circulation of air in said air supply flues in a direction opposite to the circulation of waste gases in said waste gas flue, substantially as described.

7. In a recuperator, of the type specified, the combination of a plurality of stacks arranged one within another forming separate flues comprising air supply flues and a waste gas flue arranged intermediate said air supply flues, the intermediate stack forming the outer wall of the waste gas flue comprising an extension at its lower end which extends across the outer air supply flue and communicates with a hole formed in the outer stack, and a removable plate which closes the open lower end of said extension, substantially as described.

8. In a recuperator of the type specified, the combination of a plurality of stacks arranged one within another forming separate flues comprising air supply flues and a waste gas flue arranged intermediate said air supply flues, the intermediate stack forming the outer wall of the waste gas flue comprising a downwardly inclined extension at its lower end which extends across the outer air supply flue and communicates with a hole formed in the outer stack and a removable plate which closes the open lower end of said extension, substantially as described.

9. In a recuperator of the type specified, the combination of a plurality of stacks arranged one within another forming separate flues, comprising air supply flues and a waste gas flue arranged intermediate said air supply flues, the intermediate stack forming the outer wall of the waste gas flue comprising an extension at its lower end which extends across the outer air supply flue and communicates with a hole formed in the outer stack, and a removable plate which closes the open lower end of said extension, the lower end of the inner stack forming the inner air supply flue extending through the wall of the extension of said intermediate stack and being in open communication with the lower end of the outer air supply flue, which is adapted to be connected with the combustion space of a furnace, substantially as described.

In testimony, that I claim the foregoing as my invention, I affix my signature this 4th day of October A. D. 1920.

ROBERT SCHLEMM.